United States Patent [19]

Boisset

[11] 4,372,609
[45] Feb. 8, 1983

[54] VEHICLE SEATS COMPRISING A SHELL-SHAPED FRAME

[75] Inventor: Bernard Boisset, Etampes, France

[73] Assignee: Societe Industrielle Bertrand Faure, Etampes, France

[21] Appl. No.: 204,697

[22] Filed: Nov. 6, 1980

[30] Foreign Application Priority Data

Nov. 14, 1979 [FR] France .................... 79 28118

[51] Int. Cl.³ .......................................... A47C 1/025
[52] U.S. Cl. ................................. 297/362; 297/355; 297/358
[58] Field of Search ............... 297/362, 361, 358, 354, 297/355, DIG. 2, 329

[56] References Cited

U.S. PATENT DOCUMENTS

| 137,091 | 3/1873 | Parker | 297/329 X |
| 1,970,577 | 8/1934 | Schauss | 297/329 |
| 2,299,538 | 10/1942 | Goldstein | 297/329 |
| 2,947,350 | 8/1960 | Davis | 297/355 |
| 3,710,418 | 1/1973 | Kratzer | 297/362 X |

FOREIGN PATENT DOCUMENTS

| 2735522 | 2/1979 | Fed. Rep. of Germany | 297/354 |
| 1205179 | 9/1970 | United Kingdom | 297/355 |

Primary Examiner—William E. Lyddane
Attorney, Agent, or Firm—Cushman, Darby & Cushman

[57] ABSTRACT

The invention relates to a vehicle seat whose frame is formed by a shell made from moulded plastic material. This shell is formed from two half-shells, one for the sitting portion 1 and one for the seat back 4 and these two half-shells comprise complementary slide elements 10-13 adapted to slide against each other and centered on the same transverse horizontal axis disposed in the vicinity of the pivoting axis of the hips of the person sitting in the seat, these elements being associated with a mechanism 18, 19 for adjusting and locking their mutual sliding positions.

8 Claims, 3 Drawing Figures

U.S. Patent  Feb. 8, 1983  4,372,609
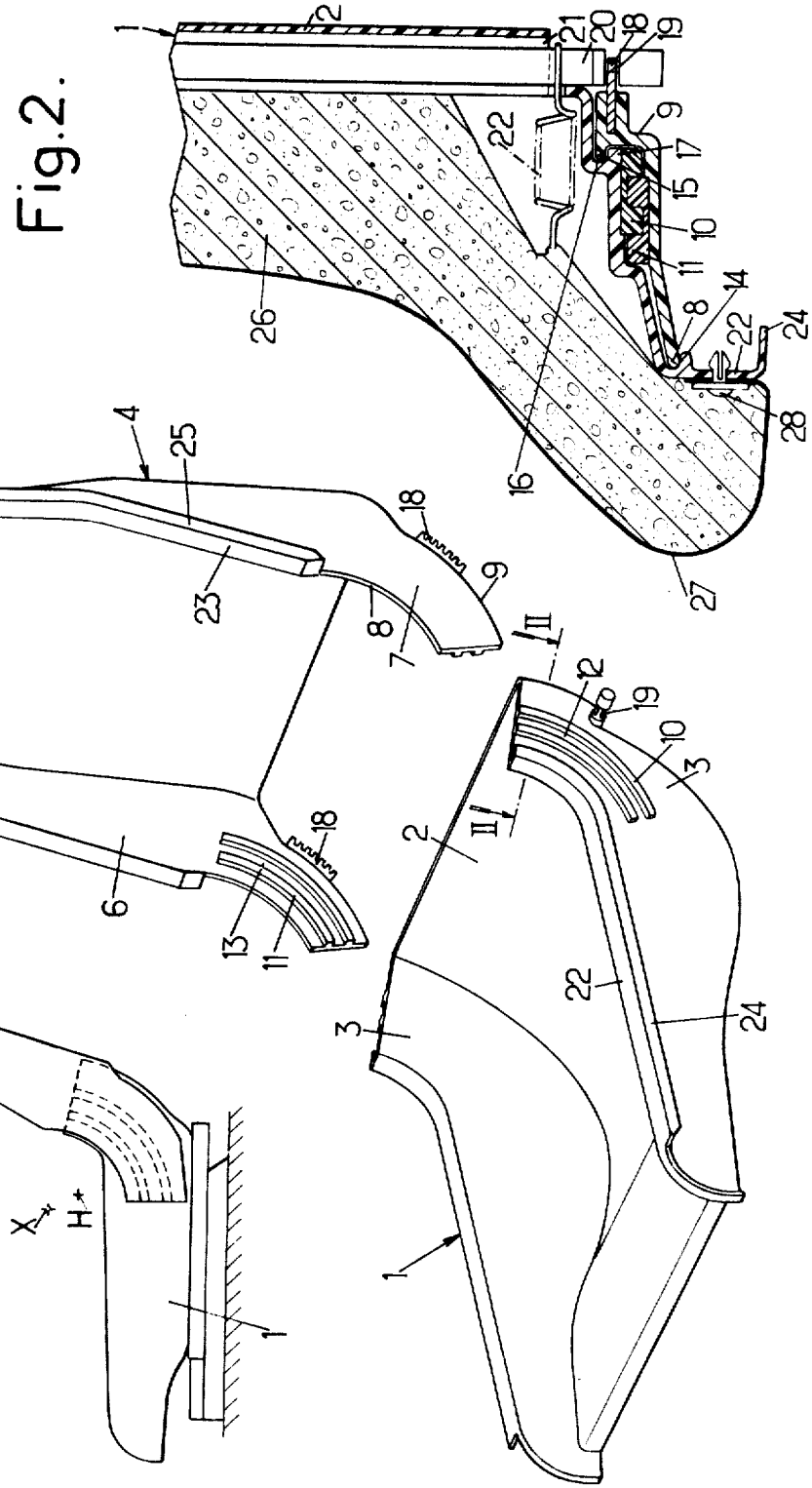

VEHICLE SEATS COMPRISING A SHELL-SHAPED FRAME

The invention relates to vehicle seats in which at least the framework comprising the cushion of the sitting portion is formed by a shell, i.e. by a continuous shaped sheet, said shell being preferably formed by moulding a plastic material, but able to be formed differently, for example by stamping a metal sheet of aluminium or other material.

The advantage which such sheets present with respect to those having a discontinuous steel framework is known, particularly as regards the lightness, the resistance to deterioration and the simplicity of the shaping and fitting of the cushions, considering that it is easy to give directly to a shell a basin shape to fit the anatomy of a seated person.

But in the known embodiments of seats of the kind in question, the shells are formed in a single block and do not therefore lend themselves to adjustment and inclination of the seat back: the hinging of seat backs with adjustable inclination causes in fact a considerable concentration of loads and stresses at the level of the hinging axis, and the relatively thin flanges of the shells do not lend themselves very well to absorbing these concentrated loads and stresses.

The invention has therefore as an aim, especially, to remedy this disadvantage by making possible such adjustment of the inclination of the seat back in the seats considered.

To this end, in accordance with the invention, said seats are essentially characterized in that the sitting portion shell is independent of the framework of the seat back and in that complementary slide elements extending along arcs of a circle centered on the same transverse axis X are carried respectively by the rear part of the sitting portion shell and by the base of the seat back framework, these elements being mounted so as to be able to slide against each other, a mechanism operable by the person sitting in the seat being furthermore provided for adjusting at will the inclination of the seat back of the seat around axis X by operating on the position of the slide elements of the seat back along the slide elements of the sitting portion.

In preferred embodiments, recourse is had furthermore to one and/or the other of the following arrangements:

axis X is situated in the vicinity of the pivoting axis of the hips of the person sitting in the seat, the framework of the seat back is also formed by a shell, the slide elements are ribs projecting respectively from the rear portions of vertical flanges delimiting laterally the sitting portion shell and from forwardly bent vertical lugs forming the base of the framework of the seat back, the above ribs project respectively from the outer faces of the flanges of the sitting portion and from the inner faces of the lugs of the seat back, the above lugs (or rear portions of the above flanges) are defined on at least one of their curvilinear edges by a rim in the form of an arc of a circle centered on axis X, said rim being housed in a complementary curvilinear groove forming part of the rear portions of the above flanges (or forming part of the above lugs), the above ribs are formed from a plastic material, the ribs corresponding to a shell framework are integrally moulded with this shell, the adjustment mechanism comprises at least one curved rack centered on axis X and integral with the framework of the seat back (or with the sitting portion shell) and a toothed rotatable member associated with a control handle easily accessible to the person sitting in the seat, this member being carried by the sitting portion shell (or the framework of the seat back) and adapted to coact with said rack, in a seat according to the preceding paragraph, the adjustment mechanism comprises two curved racks passing respectively along the rear edges of the two lugs included in the framework of the seat back and two toothed members adapted to coact respectively with two racks and integral with the same transverse bar carried by the sitting portion shell and rotatably coupled to a control handle accessible to the person sitting in the seat.

The invention comprises, apart from these principal arrangements, certain other arrangements which are used preferably at the same time and which will be more explicitly discussed hereafter.

In what follows, there will be described a preferred embodiment of the invention with reference to the accompanying drawings in a way which is of course in no wise limiting.

FIG. 1 of these drawings shows a perspective view of a vehicle seat framework formed, in accordance with the invention, from two "half-shells" shown here separated from one another.

FIG. 2 is a partial section along II—II of FIG. 1 of the unit formed by these two half-shells assembled.

FIG. 3 is a side view of this unit.

The framework of the seat considered is here formed, not from a single monoblock shell extending from the front of the sitting portion to the top of the seat back of the seat, but from two distinct shell portions corresponding respectively to this sitting portion and to this seat back; these portions will be designated hereafter by the expression "half-shells" to simplify the description, although it is not exactly a question of halves of a shell.

Each of these two half-shells is preferably formed from a moulded plastic material which is advantageously polyester resin reinforced with glass fibers or similar.

The sitting portion half-shell 1 has the general shape of a trough whose bottom 2 extends substantially along a cylindrical surface with a transverse horizontal axis, the longitudinal vertical section of this surface having the form of an S lying down in this sense that its rear edge is raised whereas its front edge is on the contrary bent forwards. The lateral sides of said trough are formed by vertical flanges 3.

The seat back half-shell 4 has the general shape of a substantially vertical panel 5 extended laterally forwards by two vertical cheeks 6 having a triangular trend, these cheeks being wider at their base than at their top and being themselves extended downwards by vertical forwardly curved lugs 7.

These lugs 7 are defined at the front and at the rear by edges 8 and 9 extending along arcs of a circle centered on the same transverse axis X, i.e. orientated according to the width of the seat, the position of said axis being discussed further on.

The rear zones of flanges 3 and lugs 7 are provided with complementary slide elements extending along arcs of a circle centred on axis X and adapted to slide along each other.

The slide elements comprise circular ribs 10 projecting outwardly (i.e. towards the outside of the seat) from flanges 3 and circular ribs 11 projecting inwardly (i.e. towards the inside of the seat) from lugs 7.

The ribs in question are for example two in number for each type, two adjacent ribs 10 defining therebetween a groove 12 adapted to receive jointingly one of ribs 11, and two adjacent ribs 11 defining therebetween a groove 13 adapted to receive jointingly one of the ribs 10.

The numbers, lengths and sections of the different ribs 10 and 11 in mutual engagement are chosen sufficient to absorb all the stresses likely to be exerted on the seat back not only towards the front but also towards the rear.

The cross-section of each rib 10 or 11 is preferably rectangular as illustrated.

Said ribs are advantageously formed from a plastic material. They may be moulded directly with the corresponding half-shells.

But it might be advantageous, in some cases, to form them independently from these half-shells, especially from a material particularly wear-resistant and having a low friction coefficient such as polyamide or a PTFE, the ribs then being added to the corresponding flanges or lugs in any desirable way, for example by bonding, welding or screwing.

To prevent any mutual disengagement of the ribs in the transverse direction, there is provided on one at least of the two ribbed elements 3, 7 of each pair of such elements at least one circular rim centred on axis X and there is provided on the other element a circular cap or groove jointingly fitting over said rim.

In the illustrated embodiment:

a first such rim is formed by the front edge 8 of each lug 7, which is housed jointingly in a circular groove 14 (FIG. 2) formed by bending back the edge of the corresponding flange 3, a second such rim 15 is formed by the rear lower heel, of each lug 7, bent successively back towards the inside of the seat then towards axis X, this rim 15 being itself housed in a second groove 16 provided externally in the rear lower zone of the corresponding flange 3.

It should be noted that the above bent-back heel 15 may itself be considered as fitting over a circular rear bead 17 of flange 3, as can be seen in FIG. 2.

The fitting of the seat back half-shell to the sitting portion half-shell is effected by first of all causing the axes of their respective circular slide elements to coincide, then by introducing "circularly" the ends of lugs 7 into the complementary housings of flanges 3, the different ribs thus being introduced into the corresponding grooves and the curved rims into the grooves which are intended to receive them.

If no intermediate stop is provided, the seat back half-shell thus introduced into the sitting portion half-shell comes, under the force of gravity, to occupy its lower position of maximum penetration, which position corresponds to the maximum tilt of the seat back from the vertical and to the mutual contact of certain sections of the lower rims of lugs 7 and/or of the upper rims of flanges 3 with corresponding end of travel bearing surfaces.

Actually, this penetration is limited at will by means of an adjustment and locking mechanism which will be described hereafter.

This adjustment allows the tilt of the seat back of the seat to be modified at will.

For this, the position of axis X is provided not relatively high and far in front of the seat back, as if it were a matter of the centre of curvature of an arc of a circle passing respectively through the front end of the sitting portion, through the rear bottom thereof and through the top of the seat back.

This axis is situated on the contrary relatively low and rearwards, preferably in the vicinity of the pivoting axis H of the hips of the user of the seat (see FIG. 3).

By way of illustration, said axis X is situated at a height of the order of 12 to 15 cm above the lowest point of the median zone of the bearing surface of the sitting portion cushion and at a horizontal distance of the order of 15 to 20 cm in front of the base of the median zone of the bearing surface of the seat back cushion.

In practice, this measurement leads to giving a relatively small value, i.e. about ten centimeters or so only, to the radii of curvature of the upper front edges 8 and 14 of the curved sliding elements which laterally enclose said cushions.

Under these conditions, any modification of the degree of penetration of the seat back half-shell into the sitting portion half-shell, which causes a modification of the tilt of the seat back about this axis X, corresponds to a natural modification of the tilt of the back of the person seated and not to a simple shortening or lengthening of the seat back without substantial modification of its general tilt.

The adjustment and locking mechanism considered comprises:

at least one rack 18 extending along an arc of a circle centered on axis X and integral with one of the half-shells, a toothed rotatable member 19 carried by the other half-shell and adapted to cooperate with rack 18, the rotation of this member being controlled by a handle (not shown) easily accessible to the person sitting in the seat, and means for locking this toothed member 19 in a plurality of angular positions corresponding to as many different inclined positions of the seat back.

In the illustrated embodiment, the number of circular racks 18 is equal to two and these racks are formed by cut-out metal plates joined to the lower rear edges of lugs 7 so that their teeth are orientated downwardly and rearwardly, whereas the toothed members 19, two in number also, are integral with the same rigid transverse bar 20 carried by the sitting portion half-shell 1, at the rear thereof.

The toothed members 19 may have any desired shape: thus they may be formed by pinions associated with angular locking means.

In the illustrated construction, these toothed members 19 are each formed by two identical cylindrical pinions with axes parallel to the axis X and symmetrical with one another with respect to the axis of bar 20, these pinions being adapted to coact with the teeth of racks 18.

Furthermore, bar 20 is mounted so as to be able to roll and slide jointingly in a flange 21 of the sitting portion half-shell, the vertical longitudinal cross-section of said flange being elongated horizontally and defined at the bottom and the top by two parallel straight line segments, and helical tension springs are provided for constantly urging bar 20 forwards and upwards so as to push pinions 19 to the bottom of the facing notches of the corresponding racks.

Under these conditions, at rest, all the pinions are housed at the bottom of such notches and the mechanism is locked.

From such a rest position, rotation of bar 20 causes successive pivoting movements of this bar about coaxial pinions situated on each side of the seat, these pinions forming in turn fixed pivoting swivels for said bar: each of these successive pivoting movements corresponds to sliding of the seat back half-shell upwards or downwards, i.e. a reduction or an increase of its tilt with respect to the vertical about axis X.

This mechanism presents the advantage of ensuring automatically excellent locking for each of its adjustment positions.

There can further be seen in the drawings:
- wide borders 22 and 23 extending outwardly of the seat respectively the upper rims of flanges 3 and the front rims of cheeks 6, the borders in question themselves presenting preferably end-flaps 24 and 25 oriented respectively downwards and upwards, these borders and flaps contributing both to the mechanical strengthening of the half-shells and to the general comfort of the seat,
- a foam cushion 26 (FIG. 2) fitted to the sitting portion half-shell 1 of said seat, this cushion itself having a cover 27,
- and a resilient securing means 28, partially embedded in the foam, adapted to fix one edge of cover 27 to one of the borders 22.

As is evident, and as it follows moreover already from what has gone before, the invention is in no wise limited to those of its modes of application and embodiments which have been more specially considered; it embraces, on the contrary, all variations thereof, particularly those where the framework of the seat back is not formed by a shell, but for example by a metal tubular frame welded to two ribbed metal brackets adapted to coact with the rear ribbed portions of the lateral flanges of the sitting portion shell.

I claim:

1. A vehicle seat, comprising:
   a sitting portion shell for a sitting portion cushion, this sitting portion shell having a rear and two laterally opposite vertical flanges; and
   a seat back including a frame having a base, this base comprising two laterally opposite downwardly, forwardly curving lugs;
   means defining a set of first circularly arcuate rib and groove means on each of said vertical flanges of said sitting portion shell and means defining a complimentary set of second circularly arcuate rib and groove means on each of said lugs of said seat back frame base;
   each said set of first rib and groove means being arcuately, slidingly interdigitated with a respective said set of second rib and groove means being arcuate about a transverse horizontal axis situated in the expected vicinity of the pivoting axis of the hips of the seat occupant and concave forwards and upwards, so that downward movement of the seat back is accompanied by rearward tilting of the seat back relative to the sitting portion shell; and
   adjustment means associated between said sitting portion shell and said seat back frame operable when manipulated by a given amount to slide the first and second sets of rib and groove means arcuately relative to one another by a corresponding amount, for erecting and reclining the seat back relative to the sitting portion shell.

2. The vehicle seat of claim 1, wherein:
   said sitting portion shell laterally opposite vertical flanges have means defining respective laterally outer faces, said sets of first rib and groove means being formed on said laterally outer faces; and
   said seat back frame base laterally opposite downwardly curving lugs have means defining respective laterally inner faces, said sets of second rib and groove means being formed on said laterally inner faces.

3. The vehicle seat of claim 2, wherein:
   the sitting portion shell opposite vertical flanges include respective laterally outwardly and downwardly turned upper rims, these rims constituting respective portions of said sets of first rib and groove means.

4. The vehicle seat of claim 3, wherein:
   the laterally opposite downwardly, forwardly curving lugs have means defining curvilinear upper edges constituting respective portions of said second rib and groove means, these edges respectively slidingly interdigitating with said rims.

5. The vehicle seat of claim 1, wherein:
   said sitting portion shell laterally opposite flanges are molded of plastic material and said sets of first rib and groove means are integrally molded therewith; and
   said seat back frame base laterally opposite downwardly, forwardly curving lugs are molded of plastic material and said sets of second rib and groove means are integrally molded therewith.

6. The vehicle seat of claim 1, wherein:
   said adjustment means comprises:
   at least one arcuate rack fixed on one of said seating portion shell and seat back frame;
   at least one gear rotatably mounted on the other of said seat back frame and seating portion shell, said at least one gear being respectively meshed with said at least one rack; and
   handle means associated with said at least one gear, whereby turning of the handle means by the seat occupant respectively rotates said at least one gear, causing said at least one rack to run correspondingly along said at least one gear.

7. The vehicle seat of claim 6, wherein:
   there are two said racks, a respective one being provided on each said downwardly, forwardly curving lug so as to project downwardly and rearwardly therefrom; and
   there are two said gears; bar means rigidly interconnecting said pinions and providing said handle means, so that rotating said handle means rotates both said gears via said bar means; and
   means journalling said bar on said sitting portion shell.

8. The vehicle seat of claim 7, further including:
   spring means associated between said bar and said sitting portion shell resiliently urging said gears towards greater meshing depth in said racks.

* * * * *